United States Patent

Lesher et al.

[11] Patent Number: 4,604,933
[45] Date of Patent: Aug. 12, 1986

[54] CARBIDE-TIPPED CIRCULAR SAW FOR METAL CUTTING AT LOW SURFACE SPEEDS

[75] Inventors: Ernest G. Lesher, Cleona, Pa.; Cornelius E. Mieras, Jasper, Ind.

[73] Assignee: North American Products Corp., Atlanta, Ga.

[21] Appl. No.: 546,468

[22] Filed: Oct. 28, 1983

[51] Int. Cl.⁴ .................. B23D 57/00; B27B 33/08
[52] U.S. Cl. ........................... 83/851; 83/839; 83/855
[58] Field of Search .......... 83/854, 835, 839, 848, 83/840, 851, 855, 846

[56] References Cited

U.S. PATENT DOCUMENTS

| | | | |
|---|---|---|---|
| 3,576,061 | 4/1971 | Pahlitzsch | 83/854 |
| 3,619,880 | 11/1971 | Pahlitzsch | 83/835 |
| 3,818,561 | 6/1974 | Montana et al. | 83/840 |
| 3,878,747 | 4/1975 | Soderstom | 83/854 |

FOREIGN PATENT DOCUMENTS 166266 7/1953 Australia ........................ 83/854

157917 12/1981 Japan ........................... 83/846

Primary Examiner—Frank T. Yost
Assistant Examiner—Hien H. Phan
Attorney, Agent, or Firm—James E. Nilles; James R. Custin

[57] ABSTRACT

A carbide tipped saw for cutting non-ferrous industrial metals, capable of use on a low-rpm metal sawing machine designed for saws with high-speed steel teeth, has higher hogger teeth alternating around its periphery with lower raker teeth. Each hogger has a cutting edge that is parallel to the saw axis and extends across more than half of the kerf width, defined by the junction of a positively raked front surface with a top surface. Oblique front edges on the hogger are defined by junctions of the front surface with oblique surfaces that lie between the top and side surfaces and face radially and axially outwardly. Each raker removes only side portions of the kerf and has swept-back cutting edges defined by the junctions of its top surface with chamfer surfaces that are negatively raked and face obliquely forwardly and axially outwardly.

6 Claims, 6 Drawing Figures

CARBIDE-TIPPED CIRCULAR SAW FOR METAL CUTTING AT LOW SURFACE SPEEDS

FIELD OF THE INVENTION

This invention relates to carbide tipped circular saws for metal cutting and is more particularly concerned with a carbide tipped circular saw that makes a clean smooth cut in a workpiece of industrial non-ferrous metal when it is driven at the low surface speeds at which saws with high-speed steel teeth are normally operated for cutting such metals, e.g., 700 to 1200 S.F.M.

BACKGROUND OF THE INVENTION

Carbide tipped saws have for a long time been used for cutting industrial non-ferrous metals such as aluminum, brass and copper, and it is well known that for such work they have marked advantages over saws with high-speed steel teeth. Although a carbide tipped saw is higher in cost than a high-speed steel saw, it usually cuts faster and almost invariably operates for much longer periods of time between sharpenings. Therefore, taking into account both first cost and the cost of sharpenings through the life of the saw (but disregarding other considerations for the moment) a carbide tipped saw can perform far more cutting per dollar than a high-speed steel saw.

Notwithstanding this important advantage, carbide tipped saws have not replaced high-speed steel saws for non-ferrous metal cutting, and in fact the great majority of saws now used for cutting non-ferrous metals have high-speed steel teeth.

The reason for this peculiar situation is that heretofore conventional carbide tipped saws for industrial non-ferrous metals could not be used on sawing machines designed for operation with saws having high-speed steel teeth, and most of the sawing machines now in use were designed for saws of the latter type. A heretofore conventional carbide tipped saw for non-ferrous metals has had to be driven at surface speeds (i.e., peripheral speeds) eight to ten times as fast as those needed for a comparable high-speed steel saw. To develop such high speeds, the sawing machine has to have a substantially high horsepower drive motor as well as expensive bearings, transmission elements and the like, and therefore its cost is on the order of three times that of a slower rotating machine for a high-speed steel saw.

Naturally there were a good many cases where the high first cost of the machine was more than offset by the savings to be realized with the use of a carbide tipped tool, but more often production volume has not justified investment in a machine intended for conventional carbide tipped saws, and it has been economical to accept the disadvantages of the more expensive high-speed steel saws and operate with the less expensive machine. As a result, the great majority of sawing machines now in use are slow-speed machines intended for highspeed steel saws.

It has been evident for a long time that an ideal situation would be created by the development of a carbide tipped saw that could satisfactorily cut industrial non-ferrous metals when installed on a machine designed for high-speed steel saws. From the very fact that a heretofore conventional carbide tipped saw was always driven at high surface speeds when cutting non-ferrous metals, there was no reason to believe that such a saw could be used satisfactorily on a low-speed machine, but the mere possibility of achieving some net gain, even at the cost of poor cutting quality, encouraged experiment. There may well have been other tests of this kind that were not known to the applicants, but the one that they know of was an attempt to cut through 8-inch diameter aluminum bars. Several carbide tipped saw designs were tried, all of which failed. In the nearest approach to success, the cuts were so rough that the workpiece had a torn appearance and the saw seemed to be smashing its way through the workpiece rather than cutting. This poor cutting quality was not offset by cutting economy. Instead, the tooth tips and blade body quickly became galled with aluminum, and the maximum performance achieved was 179 cuts, totalling 9,000 sq. in., feeding 30 inches minimum at 85 rpm.

These results raise the question of why a high-speed steel saw is very satisfactory for cutting non-ferrous metals when operating at a speed in the range of 700 to 1200 S.F.M. whereas a conventional carbide tipped saw is hopeless at such speeds although capable of superior performance at surface speeds six to ten times as high. In part the present invention resides in the discovery of the answer to this question, and in part it resides in discovering a remedy for the condition discovered.

When non-ferrous metal is being cut, the cutting tooth must have a positive rake, that is, the front surface of the tooth should have some radial inward inclination so that the tooth is slightly hook-shaped. This positive rake is needed in order to force the removed metal to curl down into the tooth gullet instead of breaking off at the cutting edge and clogging the kerf. Positive rake is needed on the teeth of both high-speed steel saws and carbide tipped saws.

It has been found that when a carbide tipped saw with positively raked teeth is working on non-ferrous metal while rotating at a relatively low speed, the teeth tend to wander from side to side in the kerf. In a carbide tipped saw each carbide insert is slightly wider than the blade body and is ground to have its side surfaces slightly convergent rearwardly from its front surface. The insert therefore has no more than line contact with the side surfaces of the kerf, along the side edges of its front face. Those edges cannot provide enough support to stabilize the tooth against lateral excursions, and to make matters worse they act as cutting edges that remove metal from the side surfaces of the kerf and thereby afford more freedom for such excursions. The deflection forces upon the cutting tooth are carried into the blade body and tend to set the saw as a whole into a vigorous lateral vibration that results in the rough and crooked cuts, fracturing of the carbide tips and aluminum galling that were observed in the above described experiment.

The teeth of a high-speed steel saw do not have side clearances, their side surfaces being coplanar with the saw body. Therefore, even though high-speed steel cutting teeth may be subjected to the same lateral forces that act upon a carbide tipped tooth, the side surfaces of the kerf effectively confine the teeth and the saw body against lateral excursions.

In the case of a conventional carbide tipped saw cutting non-ferrous metal while rotating at the high speed for which it is intended, there is an altogether different explanation for the relatively smooth cutting operation of the tool. At high surface speeds a cutting tooth exerts a relatively high forward force upon the metal of the workpiece whereby a curling chip is more or less peeled off of it without generating sideward deflecting forces that tend to set the saw into lateral vibration.

It will be apparent from this explanation that neither the prior art teachings relating to high-speed steel saws nor those relating to carbide tipped saws could afford any suggestion for the design of a carbide tipped saw capable of satisfactorily cutting non-ferrous industrial metals when driven at the low surface speeds at which a high-speed steel saw is normally operated for cutting such metals. Furthermore, the problem is one that is peculiar to the sawing of non-ferrous metals, and therefore no help could be expected from teachings relating to saws for ferrous metals.

As examples of patents disclosing prior carbide tipped saws for cutting industrial non-ferrous metals, intended to be operated at high surface speeds, reference can be made to U.S. Pat. No. 2,720,229 to Drake and U.S. Pat. No. 3,576,200 to Elmes. An early disclosure of a currer for non-ferrous metals that could take the form of a saw with high-speed steel teeth is U.S. Pat. No. 543,608 to Beale.

SUMMARY OF THE INVENTION

The general object of this invention is to provide a carbide tipped circular saw for cutting non-ferrous metals, suitable for being installed on a sawing machine intended for operation with saws having high-speed steel teeth and capable of making clean cuts and of operating for long periods of time between sharpenings when driven at the low rotational speeds conventional with such machines.

Thus it is also a general object of the invention to permit carbide tipped saws for non-ferrous industrial metals to be used on the great majority of metal sawing machines, which had heretofore been limited to operation with saws having high-speed steel teeth, so that owners and users of such existing machines can enjoy the economy and efficiency of carbide tipped saws without having to make large capital investments in order to do so.

Another and more specific object of this invention is to provide a carbide tipped saw for cutting non-ferrous industrial metals having positively raked teeth that can aggressively penetrate the workpiece and remove a curled chip and having means for effectively confining those teeth against lateral excursions even though the saw has a surface speed which is substantially lower than has heretofore been considered feasible for a carbide tipped saw and which is in the range of surface speeds at which saws with high-speed steel tips have conventionally been operated Another and very important objective of this invention is to provide a carbide tipped saw that achieves the objectives and possesses the advantages set forth above and wherein the teeth are arranged in pairs, there being teeth on the saw of only two different configurations which alternate with one another around the periphery of the blade, thus minimizing the labor and difficulties involved in grinding and dressing the teeth.

In general, these and other objects of this invention that will appear as the description proceeds are achieved in the carbide tipped circular saw of this invention, which is a carbide tipped saw for cutting non-ferrous industrial metals, to be driven at low surface speeds, and which comprises a blade body that has an axis and a plane of symmetry normal to its axis and has gullets that separate circumferentially spaced teeth, and wherein each tooth comprises a carbide insert which defines a front portion of the tooth and which has opposite side surfaces that face substantially axially outwardly and a top surface that faces away from said axis, the teeth being arranged in pairs to cooperate for triple-chip cutting, each pair comprising a lead tooth and a rearwardly adjacent follower tooth. Each lead tooth has a cutting edge defined by the junction of its top surface with a front surface on it, said cutting edge being parallel to the blade body axis and extending across said plane of symmetry. The saw of this invention is characterized by each lead tooth having its said front surface at a positive rake angle and by said cutting edge thereon extending across at least half the distance between the side surfaces of the lead tooth but having its ends spaced inwardly from those side surfaces. Further, each follower tooth has a pair of oppositely oblique cutting edges, each of which is inclined rearwardly and towards one side surface of the blade and has an end near that side surface. Each of said oblique cutting edges is at a lesser distance from the blade body axis than the cutting edge on the lead tooth, and each of those oblique cutting edges is defined by the junction of the top surface on the follower tooth with an obliquely forwardly and sidewardly facing surface portion thereon. Each such obliquely facing surface portion is at a negative rake angle.

The difference in height as between the lead teeth and the follower teeth and the length of the cutting edge on each lead tooth are such that the positively raked lead teeth do most of the cutting, while the negatively raked follower teeth do little cutting but produce forces at their opposite sides that keep the saw centered in the cut.

BRIEF DESCRIPTION OF DRAWINGS

In the accompanying drawings, which depict what is now regarded as a preferred embodiment of the invention.

DETAILED DESCRIPTION OF PREFERRED EMBODIMENT OF THE INVENTION

Figure 1:
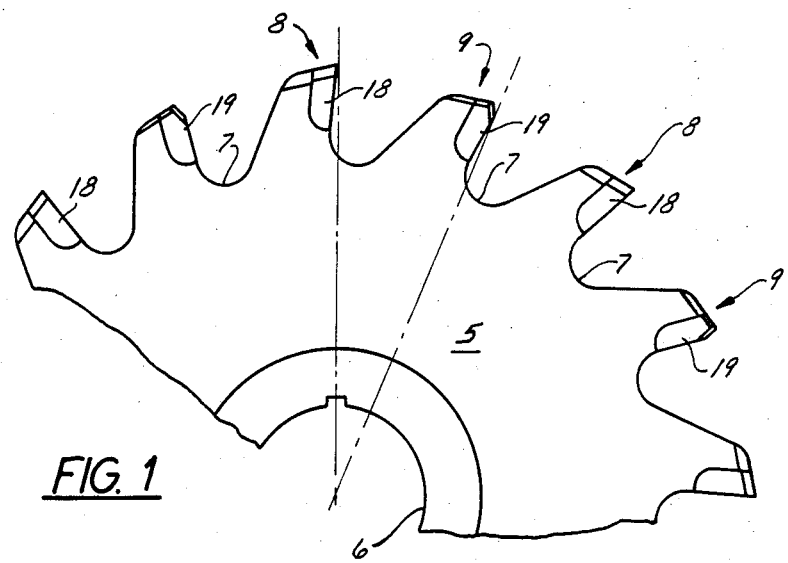
FIG. 1 is a side view of a part of a metal cutting carbide tipped circular saw of this invention.
Figure 4:
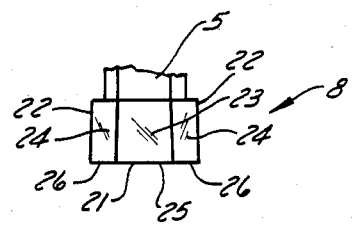
FIG. 4 is a top view of a lead tooth.
Figure 6:
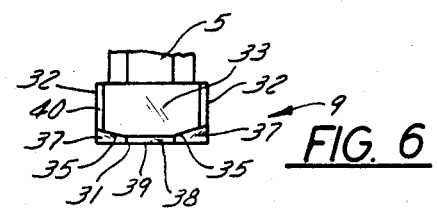
FIG. 6 is a top view of a follower tooth.
Figure 3:
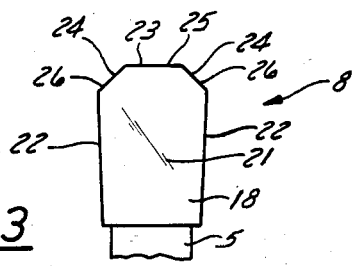
FIG. 3 is a fragmentary view in section taken on the plane of the line 3—3 in FIG. 2, showing the profile of a lead tooth as seen from in front of the same.
Figure 5:
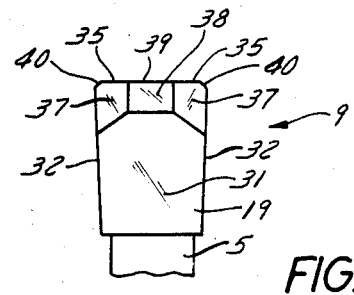
FIG. 5 is a fragmentary view in section taken on the plane of the line 5—5 in FIG. 2, showing the profile of a follower tooth as seen from in front of it.
Figure 2:
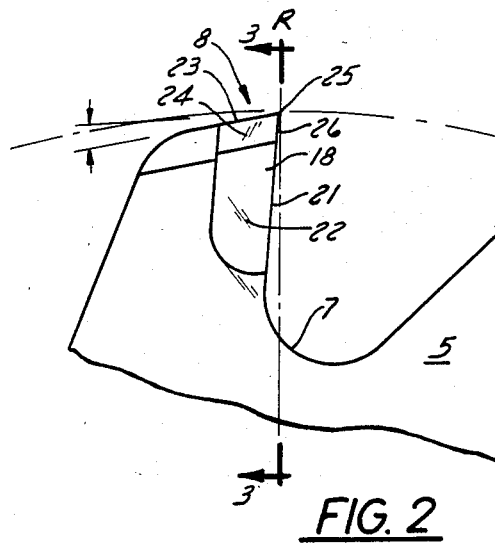
FIG. 2 is an enlarged fragmentary view generally similar to FIG. 1 but showing only a peripheral portion of the saw.

A circular saw of this invention, for cutting of non-ferrous industrial metals, comprises a disc-like blade body 5 that has a concentric arbor hole 6 whereby the saw is mounted on a sawing machine arbor (not shown) and the center of which defines the axis of the saw. Around its periphery the blade body has relatively deep radially outwardly opening bays or gullets 7 that define circumferentially spaced apart teeth 8, 9 of the saw. In this case all of the gullets 7 can be substantially identical with one another and spaced apart at uniform circumferential intervals.

Each of the teeth 8, 9 comprises a block-like carbide insert or tip 18, 19 that defines the front portion of the tooth, including its cutting edge. As is conventional, the width of each insert 18, 19 is somewhat greater than the thickness of the blade body 5, so that each insert projects slightly beyond the body surfaces.

Every-other tooth 8 around the periphery of the saw is a lead tooth or hogger that does most of the cutting. The rest of the teeth 9 are follower teeth or raker teeth which cut only small portions along opposite sides of the kerf and which mainly serve to steady the blade body 5 and prevent it from going into flatwise vibration in response to the lateral forces that the lead teeth 8 tend to impose upon it. The teeth thus cooperate in pairs, each pair comprising a lead tooth 8 and its rearwardly adjacent follower tooth 9. As the description proceeds, it will be apparent that the teeth 8, 9 are configured to produce a cutting action which bears a general resemblance to triple-chip cutting but which differs importantly from conventional triple-chip cutting in that the lead teeth 8 do substantially more cutting than the follower teeth 9, whereas conventionally the lead teeth remove no more material than the follower teeth and usually remove less than the follower teeth.

As the description proceeds it will be apparent that all teeth 8, 9 as well as the blade body 5 are symmetrical to a plane that is normal to the saw axis.

Each lead tooth 8 has a flat front surface 21 that is normal to the plane of symmetry, opposite side surfaces 22 that face away from that plane, and a top surface 23 that faces substantially away from the saw axis. In addition, each lead tooth has two chamfer surfaces 24 that flank the top surface 23, each extending laterally between the top surface 23 and a side surface 22 and each extending all along the lead tooth insert 18 from front to rear thereof. Each of the chamfer surfaces 24 faces obliquely radially and axially outwardly, preferably at an angle of 45° to the plane of symmetry. The side surfaces 22 of each lead tooth can have conventional radial and side clearances, that is, they can be slightly radially inwardly convergent (e.g., 1½ to 3° to the plane of symmetry) and slightly rearwardly convergent (e.g., 1° to 2° to the plane of symmetry).

A primary cutting edge 25 on each lead tooth 8 is defined by the junction of its front surface 21 with its top surface 23, and this cutting edge 25 extends parallel to the saw axis. Each lead tooth also has a pair of secondary cutting edges 26, each defined by the junction of a chamfer surface 24 with the flat front surface 21. It will be apparent that each secondary cutting edge 26 has cutting engagement with metal only along the portion thereof that is adjacent to the primary cutting edge 25.

The top surface 23 has back clearance, that is, it is inclined rearwardly and radially inwardly relative to a plane that is tangent to the saw periphery and contains the primary cutting edge 25. Preferably the angle of such back clearance is on the order of 8° to 10°. The chamfer surfaces 24 similarly have back clearance.

An important feature of the lead tooth 8 is that it has positive rake or hook, preferably on the order of 3° to 10°. This is to say that the flat front face 21 of the lead tooth is inclined forwardly and radially inwardly relative to a plane R that contains the saw axis and the primary cutting edge 25. Another important feature of the lead tooth is that its top surface 23 has a width slightly greater than one-half of the overall width of the insert 18 comprising that tooth, and preferably on the order of 60% to 65% of that width, so that the primary cutting edge 25 and its adjacent active portions of the secondary cutting edges 26 are effective in removing metal across substantially more than half the width of the kerf.

Each follower or raker tooth 9 has a flat front surface 31 and opposite side surfaces 32 as well as a top surface 33. The width of each follower tooth tip 19, as measured between its side surfaces 32, is the same as the width of a lead tooth tip 18. The side surfaces 32 can have the same radial clearance and side clearance as the side surfaces 22 of the lead teeth 8, and the top surface 33 of each follower tooth can have the same back clearance as the top surfaces 23 of the lead teeth.

The front surface 31 of each follower tooth extends from one to the other of its side surfaces 32 and as here shown has the same positive rake angle as the front surface 21 of the lead teeth, but that front surface 31 terminates well below the top surface 33 of the follower tooth and thus does not define a cutting edge. Instead, each follower tooth has a pair of swept-back cutting edges 35, one adjacent to each of its side surfaces 32, each defined by the junction of its top surface 33 with a front chamfer surface 37. The two front chamfer surfaces 37 flank a central land surface 38 that extends between the main front surface 31 and the top surface 33 and defines at its junction with the top surface an edge 39 that extends between the two oblique cutting edges 35 and is parallel to the saw axis. This central edge 39 is not truly a cutting edge because it is substantially lower (i.e., nearer the saw axis) than the primary cutting edge 25 on each lead tooth, preferably by about 0.012 to 0.020 inch. Furthermore, the width of the central land surface 38 is less than half the width of the kerf, preferably on the order of 35% to 40% of the kerf width.

The central land surface 38 is rearwardly and radially outwardly inclined relative to the front surface 31 and thus has a negative rake, preferably on the order of 10° to 15°. The front chamfer surfaces 37 that define the swept-back cutting edges 35 have substantially the same negative rake as the central land surface 38 and, in addition, each extends obliquely to the plane of symmetry of the saw, facing obliquely forwardly and axially outwardly. The angle of sweep back of each chamfer surface 37 and its cutting edge 35 is preferably about 15°.

In the preferred embodiment of the follower tooth here shown, the negative rake at the front edge 39 and the cutting edges 35 is defined by the land surface 38 and the front chamfer surfaces 37, while the major portion 31 of the front surface is at the same positive angle as the front surfaces 21 of the lead tooth. It will be evident that this configuration simplifies production because all inserts 18, 19, in their unground condition, are fastened to the blade body 5 at like angles. Obviously, however, the follower tooth inserts could be installed in the blade body with their flat front surfaces at the desired negative rake angle, eliminating the need to grind the land surface 38, so that only the swept-back front chamfer surfaces 37 would have to be ground on the front face of the insert.

The follower tooth preferably has its corners "broken", that is, there is a narrow bevel surface 40 between its top surface 33 and each of its side surfaces 32, so that each of the swept-back cutting edges 35 terminates a little short of its adjacent side surface 32 of the tooth.

The lead tooth 8, with its markedly high relation to the following raker tooth 8, does most of the cutting. Because of its positive rake, it cuts heavy chips that curl nicely ahead of it. The lower raker tooth 9, with its swept-back cutting edges 35 and negative rake, cuts very little, but instead those cutting edges 35 cooperate with the side surfaces of the kerf to keep the saw well centered in the kerf.

In early tests of the saw of this invention, a 30-inch diameter saw, cutting aluminum at 89 rpm on a metal cutting machine intended for a high-speed steel saw, was initially operated at a feed rate of only 15 in./min. (for a 0.0067 chip load), and the saw was found to wobble and vibrate severely. The feed rate was then steadily increased, and at 28 in./min. it began to smooth out considerably. Feed rate was finally brought up to 30 in./min. (0.0135 chip load), and at that rate the saw was running very smoothly, surface finish was very good, and the saw was cutting straight. The chips produced were mainly long, continuous curled chips from the lead teeth, with some substantially thinner and compacted curls from the follower teeth. The saw did not need sharpening until it had made 2165 cuts, totalling 108,824 sq. in. There was no galling of aluminum to the saw. A similar test was thereafter made on a second saw embodying the invention, with equally good results.

The significance of the differences between the saw of this invention and prior carbide tipped saws for non-ferrous industrial metals is emphasized by the fact that this saw is not suitable for operation at the high surface speeds heretofore conventional for carbide tipped saws. At such speeds its negatively raked follower teeth would be burned out.

From the foregoing description taken with the accompanying drawings it will be apparent that this invention provides a carbide tipped circular saw for non-ferrous industrial metals that is capable of being operated on a low-speed sawing machine such as has heretofore been restricted to use with high-speed steel blades, and which can very satisfactorily and efficiently cut such metals when so operated, even though its surface speed is much lower than has heretofore been considered feasible for a carbide tipped tool operating on such metals.

What is claimed as the invention is:

1. A metal cutting circular saw that comprises a blade body having an axis and a plane of symmetry normal to said axis and having gullets that separate circumferentially spaced teeth, and wherein each tooth comprises a carbide insert which defines a front portion of the tooth and which has opposite side surfaces that face substantially axially outwardly and a top surface that faces away from said axis, said saw being characterized by:
A. the teeth being arranged in pairs to cooperate for triple chip cutting, with the two teeth of each pair circumferentially adjacent to one another; and
B. each pair comprising
  (1) a lead tooth
    (a) having a cutting edge which
      (i) is parallel to said axis and
      (ii) extends across at least half the distance between the side surfaces of the lead tooth but
      (iii) has its ends spaced inwardly from those side surfaces,
    (b) said cutting edge being defined by the junction of the top surface on the lead tooth with a front surface thereon, and
    (c) said front surface being at a positive rake angle, and
  (2) a follower tooth
    (a) having a pair of oppositely oblique cutting edges, one at each side of said plane of symmetry,
      (i) each of which is inclined rearwardly away from said plane and
      (ii) each of which is at a smaller distance from said axis than said cutting edge on the lead tooth,
    (b) each of said oblique cutting edges being defined by the junction of the top surface on the follower tooth with an obliquely forwardly and sidewardly facing surface thereon, and
    (c) each said obliquely forwardly and sidewardly facing surface being at a negative rake angle.

2. The circular saw of claim 1, further characterized by: the lead tooth having an obliquely radially and axially outwardly facing surface between each of its side surfaces and its top surface which meets its said front surface at an inclined edge that extends from an end of its said cutting edge to the adjacent side surface.

3. The circular saw of claim 1, further characterized by: said cutting edge on the lead tooth extending across a distance equal to about 60% to 65% of the distance between the side surfaces of the lead tooth.

4. A metal cutting circular saw that comprises a blade body having an axis and a plane of symmetry normal to said axis and having gullets that separate circumferentially spaced teeth, wherein each tooth comprises a carbide insert which defines a front portion of the tooth and which has opposite side surfaces that face substantially axially outwardly and a top surface that faces away from said axis, said saw having its teeth arranged in pairs for triple-chip cutting, each pair comprising a lead tooth for removing material in a central zone of a kerf cut by the saw and a rearwardly adjacent follower tooth for removing material from side portions of the kerf, each lead tooth having a cutting edge that extends parallel to said axis across said plane of symmetry and has its ends spaced inwardly from the side surfaces of the lead tooth, said saw being characterized by:
A. said cutting edge on each lead tooth
  (1) being defined by the junction of the top surface of the lead tooth with a front surface thereof that has a positive rake angle, and
  (2) extending across at least half of the distance between the side surfaces of the lead tooth; and
B. each follower tooth having a pair of swept-back cutting edges, one at each side of said plane of symmetry, each said swept-back cutting edge being defined by the junction of the top surface on the follower tooth with a front chamfer surface thereon which
  (1) faces obliquely forwardly and away from said plane and
  (2) has a negative rake angle, so that each follower tooth removes substantially less material from a workpiece than its forwardly adjacent lead tooth.

5. The circular saw of claim 4, further characterized by: each lead tooth having a bevel surface between each of its side surfaces and its top surface that faces obliquely radially and axially outwardly and extends rearwardly from said front surface of the lead tooth to define with said front surface an oblique front edge that extends between said cutting edge and the side surface.

6. The circular saw of claim 4, further characterized by: each follower tooth having a narrow, elongated bevel surface between each of its side surfaces and its top surface, each said bevel surface extending lengthwise rearwardly from one of said chamfer surfaces to define a "broken corner" on the follower tooth.

* * * * *